(12) United States Patent
Katagiri et al.

(10) Patent No.: US 8,202,027 B2
(45) Date of Patent: Jun. 19, 2012

(54) WATER TREATMENT PAD FOR DRILLING TOOL

(75) Inventors: Fujio Katagiri, Hatsukaichi (JP); Yoshiyuki Takano, Hatsukaichi (JP)

(73) Assignee: Shibuya Company, Ltd., Hiroshima (JP)

( * ) Notice: Subject to any disclaimer, the term of this patent is extended or adjusted under 35 U.S.C. 154(b) by 911 days.

(21) Appl. No.: 12/254,991

(22) Filed: Oct. 21, 2008

(65) Prior Publication Data
US 2010/0021250 A1    Jan. 28, 2010

(30) Foreign Application Priority Data
Jul. 28, 2008 (JP) .............................. P2008-193214

(51) Int. Cl.
*B23B 47/28* (2006.01)
*B23B 51/06* (2006.01)

(52) U.S. Cl. .......... 408/56; 175/209; 408/67; 408/115 R
(58) Field of Classification Search .......... 175/209–210; 408/56, 61, 115 R, 67
See application file for complete search history.

(56) References Cited

U.S. PATENT DOCUMENTS

| | | | | |
|---|---|---|---|---|
| 1,857,748 A | * | 5/1932 | Walker | 408/56 |
| 1,927,865 A | * | 9/1933 | Aldeen | 408/56 |
| 2,140,901 A | * | 12/1938 | Etzenhouser et al. | 408/56 |
| 2,151,205 A | * | 3/1939 | Hawn | 408/56 |
| 2,279,186 A | * | 4/1942 | Terry et al. | 175/210 |
| 3,033,298 A | * | 5/1962 | Johnson | 175/209 |
| 3,610,349 A | * | 10/1971 | Dempsey | 175/209 |
| 3,946,818 A | | 3/1976 | Ek | 175/209 |
| 6,145,162 A | * | 11/2000 | Deutschenbaur et al. | 15/339 |
| 7,703,552 B2 | | 4/2010 | Katagiri | 175/209 |
| 2008/0156538 A1 | | 7/2008 | Katagiri | 175/211 |

FOREIGN PATENT DOCUMENTS

| | | | |
|---|---|---|---|
| EP | 799674 A1 | * | 10/1997 |
| EP | 1939392 | | 7/2008 |
| FR | 2667111 | | 3/1992 |
| JP | 59147617 A | * | 8/1984 |
| JP | 2003-127131 | | 5/2003 |
| JP | 2008-68328 | | 3/2008 |
| JP | 2008-162121 | | 7/2008 |
| SU | 1565646 A | * | 5/1990 |

* cited by examiner

*Primary Examiner* — Daniel Howell
(74) *Attorney, Agent, or Firm* — Roberts & Roberts, LLP

(57) ABSTRACT

There is provided a water treatment pad for a drilling tool capable of being fixed quickly and firmly. The present invention provides a water treatment pad for a drilling tool, which is installed on a drilling surface of an object to be drilled when a hole is drilled in the object by using the rotating drill tool while machining water is supplied. The water treatment pad includes a substantially cylindrical pad body having a drain in the side surface thereof and mounted in a manner that surrounds the drilling tool, and a cylindrical diffuser ring detachably fixed in the pad body in a manner that surrounds the drilling tool to accelerate a fluid therein and release the fluid to the outside. On the end surface of the diffuser ring which comes into contact with the drilling surface, convex-shaped blades the transverse cross section of which has an airfoil profile tilting in the rotative direction of the drilling tool are arranged in an aligned manner. On a plane defined by the distance between the adjacent blades and the heights of blades, the relationship between the area ($Ss_1$) on the inner surface side of diffuser ring and the area ($S_2$) on the outer surface side of diffuser ring is $S_1 < S_2$.

20 Claims, 13 Drawing Sheets

ENLARGED VIEW OF PORTION IN CIRCLE

BLADE

ENLARGED VIEW OF
PORTION IN CIRCLE

ENLARGED VIEW OF PORTION a'

PRIOR ART

PLATE SPRING

SPRING

LINK

LINK SYSTEM

SCREW

PRIOR ART

WATER TREATMENT PAD FOR DRILLING TOOL

BACKGROUND OF THE INVENTION

1. Field of the Invention

The present invention relates to a water treatment pad (hereinafter, sometimes referred to simply as a pad) used when an object to be drilled such as a concrete structure, stone, rock bed, or a steel structure is drilled by using a drilling tool such as a core drill or a hammer drill. More particularly, the present invention relates to a water treatment pad capable of being fixed quickly and firmly when being fixed to a drilling surface by making the pressure therein negative.

2. Description of the Related Art

As a device for drilling a concrete structure or the like, a drilling tool such as a core drill or a hammer drill has been known. When drilling is performed by using such a drilling tool, the rotating drilling tool is pressed against a predetermined drilling position of the concrete structure or the like, and is moved downward, by which a hole is formed. During this drilling work, chips and dust particles of concrete structure are generated. To prevent the chips and dust particles from scattering, the drilling work is generally performed while water is supplied to the drilling position. This supply of water is also useful for cooling the drilling tool. For the drilling work performed while water is supplied in this manner, a water treatment pad is used.

As shown in FIG. 14A and FIG. 14B, a water treatment pad 100 having a substantially cylindrical shape is placed on a drilling surface of the concrete structure or the like in a manner that surrounds the drilling position. Also, the water treatment pad has a drain 102 in the side surface of a pad body 101 so that water in the pad can be drained. When drilling is performed by using this water treatment pad 100, drilling is performed while water is supplied to the drilling position through a hollow part in the drilling tool and the supplied water is drained through the drain 102. By doing this, chips and dust particles produced during the drilling work are discharged from the drilling position together with water, by which chips and the like can be prevented from scattering. When the water is drained, a vacuum cleaner (hereinafter, referred to simply as a cleaner) is connected to the drain 102 to efficiently drain the water, by which the water is drained forcibly so often by the attraction force of the cleaner.

For the drilling work using the water treatment pad, the pad must be fixed to prevent the deviation of pad caused by vibrations of the rotating drilling tool and the leakage of machining water caused by the deviation of pad. As a method for fixing the pad, fixing methods using fixtures as shown in FIG. 15A, FIG. 15B and FIG. 15C are available. Each of the pad fixtures partially presses the pad against the drilling surface of an object to be drilled to fix the pad on the drilling surface by utilizing a resin, an elastic body such as a spring, or a screw. The pad fixture is used by adjusting the installation position and the number of installed fixtures according to the pad size and the drilling position.

The pad fixing method using the fixture is easy to carry out in principle, and is generally in widespread use. However, the water treatment pad has no unified standard, and the size thereof varies among the manufacturers and the like. Therefore, a fixture having optimum specifications for each pad must be prepared, which results in poor convenience. Also, when the fixture is installed, the optimum installation position must be chosen considering the center of gravity etc. of the pad. However, for example, in the case where it is desired to drill a hole at a position near a wall, the optimum installation position cannot sometimes be chosen depending on the drilling position.

Thereupon, as a method for fixing the water treatment pad, besides the method in which the above-mentioned external device is used, a method is also used in which the pad is attracted to the drilling surface by making the pressure therein negative. As described above, when the drilling work is performed, the cleaner is generally used to discharge the supplied machining water and the abatements. The attraction due to the cleaner makes the pressure in the pad negative not a little, so that the pad can also be fixed by the attraction due to the cleaner.

As the water treatment pad, besides the above-described cylindrical pad having a single internal construction as shown in FIG. 14A and FIG. 14B, a pad having a double construction. which is an improvement on the above-described cylindrical pad, is known from the viewpoint of improvement in draining efficiency (refer to Japanese Patent Application Laid-Open No. 2003-127131). This water treatment pad having a double construction is formed with an inner wall 202 circumferentially between a drain 101 and an opening 201 of a pad body as shown in FIG. 16. Thereby, water is attracted and drained via a pressure space formed between the inner surface of the pad body and the inner wall 202. In this water treatment pad, since the communication of the interior of the pressure space with the outside air is restricted, the attraction due to the cleaner easily makes the pressure in the pad negative, so that the draining efficiency can be improved. Also, a further improved water treatment pad having a double construction is described in Japanese Patent Laid-Open No. 2008-68328.

Also, the applicant of the present invention has invented and filed a water treatment pad having a still higher draining efficiency than the above-described pad having a double construction. In this water treatment pad, a predetermined inner wall plate is provided near the drain on a pad body having a single construction so that a double construction is formed partially and the pressure space is made small, by which the attraction force of cleaner is utilized effectively. In this pad also, fixation by the negative pressure therein is possible (refer to Japanese Patent Laid-Open No. 2008-162121).

However, in the above-described conventional water treatment pad, the reduction in pressure in the pad is insufficient probably because the improvement in draining efficiency is the main objective. Especially in the case where the drilling operation using a core drill proceeds and the object to be drilled is penetrated, the negative pressure in the pad cannot be kept because of the inflow of air through the penetrated hole, by which the pad cannot be fixed in some cases. Also, the pad should be fixed quickly after the start of drilling work. However, it takes much time to make the pressure in the pad negative, so that it has also been demanded that the quickness of pad fixation be improved.

SUMMARY OF THE INVENTION

The present invention has been made in the above-described background, and accordingly an object thereof is to provide a water treatment pad used when a rotatative drilling tool such as a core drill is used, which can be fixed quickly and firmly.

To solve the aforementioned problems with the conventional art, the present invention provides a water treatment pad for a drilling tool, which is installed on a drilling surface of an object to be drilled when a hole is drilled in the object by using the rotatative drilling tool while machining water is supplied, wherein the water treatment pad includes a substantially cylindrical pad body having a drain in the side surface thereof and mounted in a manner that surrounds the drilling tool; and a cylindrical diffuser ring detachably fixed in the pad body in a manner that surrounds the drilling tool to accelerate a fluid therein and release the fluid to the outside, on the end surface of the diffuser ring which comes into contact with the drilling surface, convex-shaped blades the transverse cross section of which has an airfoil profile tilting in the rotative direction of the drilling tool are arranged alignedly, and on a plane defined by the distance between the adjacent blades and the heights of blades, the relationship between the area ($S_1$) on the inner surface side of diffuser ring and the area ($S_2$) on the outer surface side of diffuser ring is $S_1<S_2$.

In the present invention, as a member for promoting the pressure reduction in the pad, the diffuser ring for accelerating a fluid on the inside and outside of the drilling tool and releasing the fluid to the drain is provided in the pad. The acceleration and release of internal fluid due to the diffuser ring have action for rapidly making the pressure in the diffuser ring negative, and the pad body is fixed via the diffuser ring.

Hereunder, the configuration and operation of the diffuser ring is explained. FIG. 1A and FIG. 1B show an example of the diffuser ring used in the present invention. The diffuser ring is a cylindrical body having a diameter capable of surrounding the drilling tool, and has irregularities on the lower end surface thereof. FIG. 2A and FIG. 2B is an upper surface view of the lower end surface of the diffuser ring. The convex part of the irregularities forms a blade having a transverse cross section of a tilting airfoil profile. The blade tilts along the rotatative direction of the drilling tool. As for the blade shape, regarding the width ($T_1$, $T_2$) of opening between the adjacent blades, the opening ($T_2$) on the outer surface side of diffuser ring is wider than the opening ($T_1$) on the inner surface side thereof, and the area ($S_2$) of the opening on the outer surface side of diffuser ring is larger than the area ($S_1$) of the opening on the inner surface side thereof.

A mechanism for making the pressure in the pad negative when such a diffuser ring is used is explained with reference to FIG. 3A, FIG. 3B and FIG. 4. FIG. 3A and FIG. 3B show a state of a fluid generated when the core drill is set in the central part of diffuser ring to drill a hole. In FIG. 3A and FIG. 3B, when the core drill is rotated to drill the hole, a flow of machining water and air is produced in the direction of A1 in the core drill. Also, around the rotating core drill as well, a flow of air is produced in the direction of A3 by the attraction of a cleaner connected to the pad body and the rotation of drill. For the drilling tool formed with serrated bits (irregularities) at the distal end thereof like the core drill, by the rotation of the drilling tool, the fluid A1 consisting of machining water, air, and dust particles in the drill is pushed out in the vector direction of A2 from between the bits at the distal end of the drill, and joins the fluid A3 around the drill. Further, since the rotating fluid is produced in the direction of A3 around the core drill, the fluid is released toward the drain of the pad body from the openings of blades of the diffuser ring arranged around the drilling tool (A4), which finally produces a rotating fluid A5.

The velocity of each fluid in the above-described process is increased as shown in FIG. 4. Specifically, the rotating fluid around the core drill (the fluid A3 in FIG. 3A and 3B) having a velocity V0 is released along the blades of diffuser ring. At this time, the velocity of fluid is increased from V0 to V1 to V2 by both actions of flow straightening due to tilted construction of blade and opening area difference between the inlet and outlet (inlet side <outlet side). The velocity of the fluid released at the velocity V2 (the fluid A4 in FIG. 3A and FIG. 3B)) is further increased to V3 by the vector synthesis with a fluid whose velocity is increased in the similar way by other blades. By the velocity increasing effect due to these blades and the vector synthesis, the velocity of the rotating fluid around the diffuser ring (the fluid A5 in FIG. 3A and FIG. 3B)) is increased to V.

By the above-described velocity difference (V–V0) between fluids, a pressure difference (P–P0) is produced between the inside and outside of diffuser ring, by which the pressure in the diffuser ring is made negative. As a result, the pad body that fixes the diffuser ring is firmly fixed to the drilling surface. Since the pressure in the diffuser ring is made negative quickly because of the quickness of velocity increasing effect of the fluid, the pad can be fixed immediately after the start of drilling work.

Also, if a fluid is only produced in the diffuser ring, the rotating fluid having the increased velocity is finally produced around the ring. Therefore, even if the rotation position of drilling tool lies at an eccentric position other than the pad center, the pressure in the diffuser ring can be made negative by the rotating fluid produced in the drilling tool and the fluid produced by the attraction of cleaner. Further, in the conventional water treatment pad, when the drilling tool penetrates an object to be drilled as the result of the drilling operation, the negative pressure cannot be kept because of the inflow of air through the penetrated hole, so that the fixation of pad becomes difficult. In the present invention, however, such a phenomenon does not take place. The velocity increasing effect of internal fluid due to the diffuser ring can be achieved by the air flowing in through the penetrated hole, by which the fixation of pad can be continued.

A preferred mode of the diffuser ring considering the above-described operation is explained in detail. The water treatment pad in accordance with the present invention is configured so that the fluid attracted from the diffuser ring is accelerated, and is finally released from the drain. Therefore, by regulating the relationship between the space (inlet) formed by the blades of diffuser ring and the drain (outlet), the load of the cleaner connected to the pad can be reduced. According to the inventors of the present invention, the ratio ($s_{1A}/S_o$) of the sum ($s_{1A}$) of the effective suction areas ($s_1$) on the inner surface side of the diffuser ring for all blades to the inside diameter area ($S_o$) of the drain provided in the side surface of the pad body is preferably set so as to be 1/20 to 1/10. The effective suction area ($s_1$) on the inner surface side of the diffuser ring means a clearance between a tangent line $l_i$ in the intrusion direction of fluid at the end part on the inner surface side of diffuser ring of the blade and a line ($l_i'$) at the time when the tangent line $l_i$ is shifted in parallel to the end part on the inner surface side of the diffuser ring of the adjacent blade. By doing this, the load of the cleaner connected to the pad can be made in a proper range (about a half of the rated attraction pressure).

Also, when a clearance between a tangent line $l_o$ in the discharge direction of fluid at the end part on the outer surface side of diffuser ring of the blade and a line ($l_o'$) at the time when the tangent line $l_o$ is shifted in parallel so as to be in contact with the adjacent blade is defined as the effective discharge area ($s_2$), the ratio ($s_1/s_2$) of the effective suction area ($s_1$) to the effective discharge area ($s_2$) is preferably set so as to be 2/9 to 1/3.

The blade shape can be designed based on the above-described relationship between $S_1$, $S_2$, $S_o$, $s_1$ and $s_2$. That is to say, $s_1$ can be set by determining the relationship between the sum ($s_{1A}$) of the effective suction areas ($s_1$) and the area ($S_o$) of the drain, and $s_2$ can be set from the relationship between $s_1$ and $S_2$. The number of blades and the shape and size of blade can be designed in a range such that the set values are kept, and $S_2$ is larger than $S_1$.

As long as the relationship of $S_1 < S_2$ is maintained, the height of blade may be uniform. Also, the height of blade may be increased gradually along the flow direction of fluid. By changing the height of blade, the area ratio of $S_1/S_2$ can be regulated. Preferably, as shown in FIG. 6, the configuration is made such that the bottom surface of a groove part formed by the adjacent blades has an airfoil profile in a longitudinal cross section. By giving an airfoil profile tilting upward to the longitudinal cross section of the groove part, the fluid is released at a velocity V5 to the lower part (near the top surface of drilling surface) of groove, and on the other hand, the fluid having a velocity V6 increased by the flow straightening effect is released onto the groove surface. A velocity difference (V6−V5) between these fluids generates a downward force (f1), so that the pad can be fixed more firmly in addition to the above-described negative pressure in the pad. In such a case, the relationship between the height (H1) of the groove on the inner surface side of diffuser ring and the height (H2) on the outer surface side of diffuser ring is preferably set so that the ratio H1/H2 is not higher than 1/3.

The diffuser ring explained above may be manufactured by integrally molding a cylindrical body part and the blades on the lower end surface thereof, or may be manufactured by producing a ring part on which the blades are formed and the cylindrical body part separately and by joining both of these two elements. Also, the material for the diffuser ring is not subject to any special restriction. The diffuser ring may be made of a resin like the pad body, or may be made of a metal.

On the other hand, for the pad body with which the diffuser ring is connected, a pad body similar to that for the conventional water treatment pad can basically be used. Also, the pad body generally has a raised part at a position at which the drain is provided in the transverse cross-sectional shape. The raised part allows machining water to be stored near the drain, so that the machining water can be drained efficiently.

The internal construction of the pad body is not subject to any special restriction. Besides the conventional pad body having a single construction, a pad body having a double construction can also be used. Also, as described above (refer to Japanese Patent Application Laid-Open No. 2008-162121), the applicant of the present invention has developed a water treatment pad mounted with a pad body of a single construction and an arcuate inner wall plate provided therein. The diffuser ring in the present invention is also effective for the water treatment pad mounted with the inner wall plate.

This inner wall plate is a plate-shaped member which is detachably mounted in the pad body and the transverse cross section of which is made in an arcuate shape by bringing both end parts thereof into contact with the inner surface of pad body at the time of mounting. A pressure space formed by this inner wall plate and the inner wall of pad body, the drain, and the internal space of diffuser ring communicate with each other, so that improvement in attraction force of cleaner caused by this partial pressure space is expected. The pressure space formed by the inner wall plate is partial and small as compared with the pressure space formed by a pad having a double construction. Thereby, the fluid can be drained efficiently by using the cleaner.

The mounting construction of inner wall plate is not subject to any special restriction if the mounting construction is such that the inner wall plate is detachable, and an arcuate space can be formed between both the ends of inner wall plate and the inner surface of pad body. For example, the mounting construction may be such that screw holes are formed at appropriate locations in the side part or upper part of the pad body, and both end parts or an upper part of the arcuate inner wall plate is screwed. Also, as a simpler mounting construction of inner wall plate, the construction may be such that a circular guide provided with an engagement groove in which the inner wall plate is fitted is formed on the upper back surface of pad body, and the inner wall plate is fixed by being engaged with the circular guide.

The material for the inner wall plate is not subject to any special restriction. Usually, the inner wall plate is made of a resin or a metal. Also, the inner wall plate has only to take an arcuate shape at the time of mounting, and the shape thereof before mounting may be arcuate or planar. By using a flat plate made of an elastic material such as a resin or a metal, both the end parts of the inner wall plate are brought into contact with the inner surface of pad by elasticity, by which an arcuate pressure space can be formed.

Also, in the present invention, in order to make the pressure space smaller, a shielding plate may be used in addition to the inner wall plate. The shielding plate is a plate body having almost the same shape as the partial shape of transverse cross section of the pressure space, and is provided between the installation part of drain and the lower end part of inner wall plate in the up and down direction (movement direction of core drill). By the installation of the shielding plate, the part above the shielding plate is excluded from the pressure space, so that the pressure space can be made small. This shielding plate is especially effective for the pad body having a raised shape near the drain as described above, and is also useful when a hole is drilled at a position near a wall.

Further, in the present invention, at least one circular plate capable of being mounted on the inner wall surface of diffuser ring so that the vertical position thereof is variable and having an opening with a diameter 1.01 to 1.2 times the outside diameter of the drilling tool may be provided. This circular plate corresponds to a lid for the diffuser ring. By the circular plate, the negative pressure state in the diffuser ring can be maintained easily. Also, in the case where machining water drops freely as in the drilling work on the ceiling surface, the circular plate can prevent the waste water from splashing on the worker.

At the lower end edge of the pad body, a ring-shaped seal member made of an elastic material is preferably provided. Since the drilling surface has many irregularities, the seal member allows the water treatment pad to be in close contact with the drilling surface, by which the leakage of machining water can be prevented. As the material for the ring-shaped seal member, specifically, single foamed sponge rubber is preferably used. This is because this material contracts when the cleaner is used, by which the adhesion of drilling surface and decrease in space can be achieved.

As described above, according to the present invention, the water treatment pad can be fixed quickly from the start of drilling work. The fixation of pad is maintained in a proper state because the pressure in the pad is efficiently made negative. Also, in the present invention, by using an appropriate member such as the inner wall plate, the machining water can be drained efficiently regardless of the work posture.

DETAILED DESCRIPTION OF THE PREFERRED EMBODIMENTS

A preferred embodiment of a water treatment pad for a core drill in accordance with the present invention will now be described with reference to the accompanying drawings.

Figure 7:
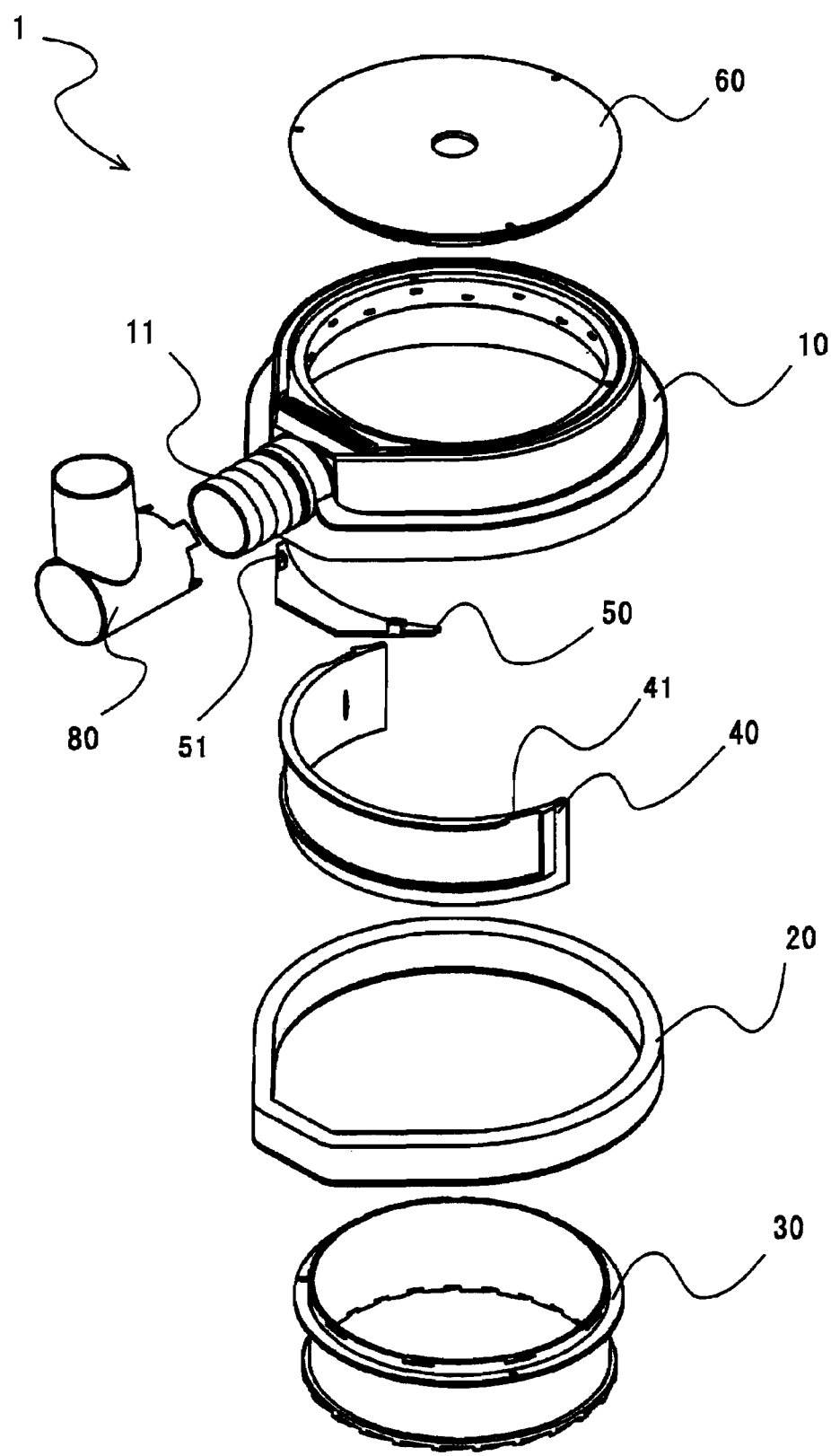
FIG. 7 is an exploded perspective view for explaining members of a water treatment pad in accordance with an embodiment of the present invention.
Figure 8A:
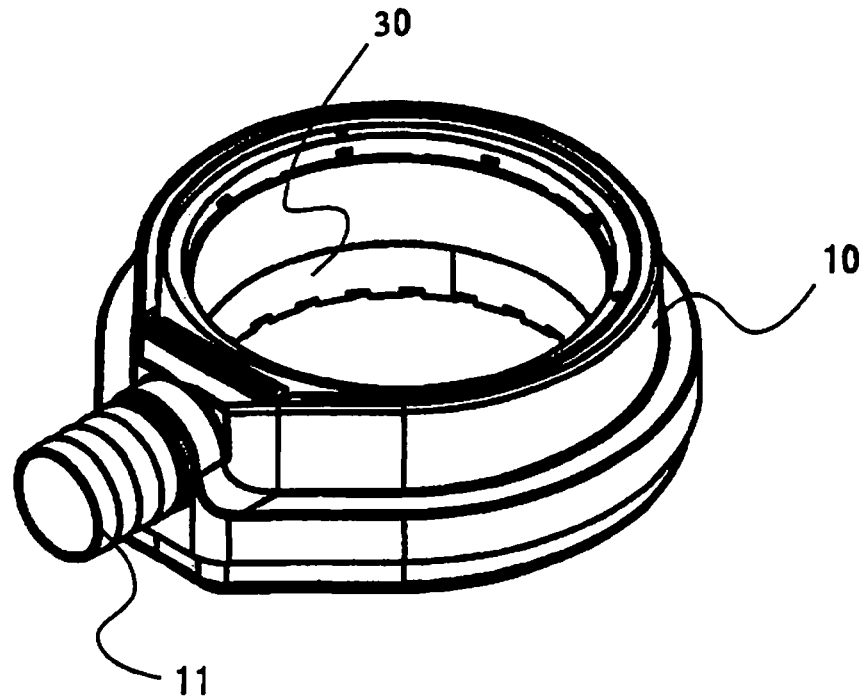
FIG. 8A and FIG. 8B are appearance views of a water treatment pad at the time when members thereof are assembled.
Figure 8B:
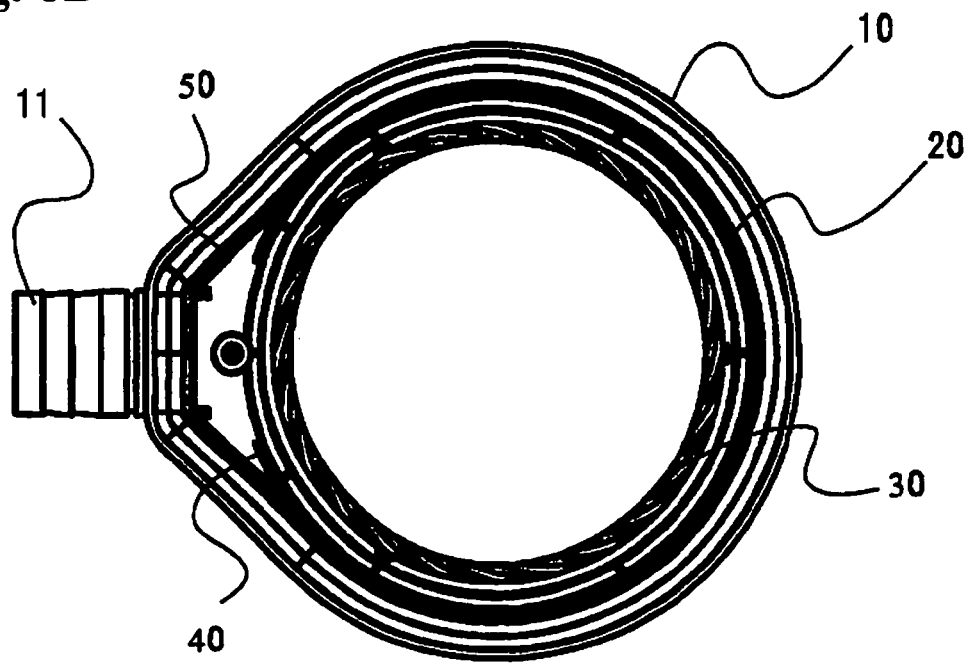

FIG. 7 shows members of the water treatment pad. The water treatment pad 1 in accordance with this embodiment includes a pad body 10 provided with a drain 11, a ring-shaped seal member 20 made of sponge rubber, which is attached to the lower end part of the pad body 10, a resin-made diffuser ring 30 attached in the pad body 10, an inner wall plate 40. and a shielding plate 50. The pad body 10 is of a shape having a raised part at a position at which the drain 11 is provided. Also, the water treatment pad 1 includes a circular plate 60 serving as a lid on the upper surface of the diffuser ring 30. In this embodiment, a rotatably connected substantially L-shaped socket 80 is connected to the drain 11. The socket 80 regulates the draining direction of machining water in conformity with the work posture and drilling direction (floor surface (lower surface) drilling, ceiling surface (upper surface) drilling). FIG. 8A and FIG. 8B show an appearance of the water treatment pad 1 in which the members have been assembled.

Figure 9:
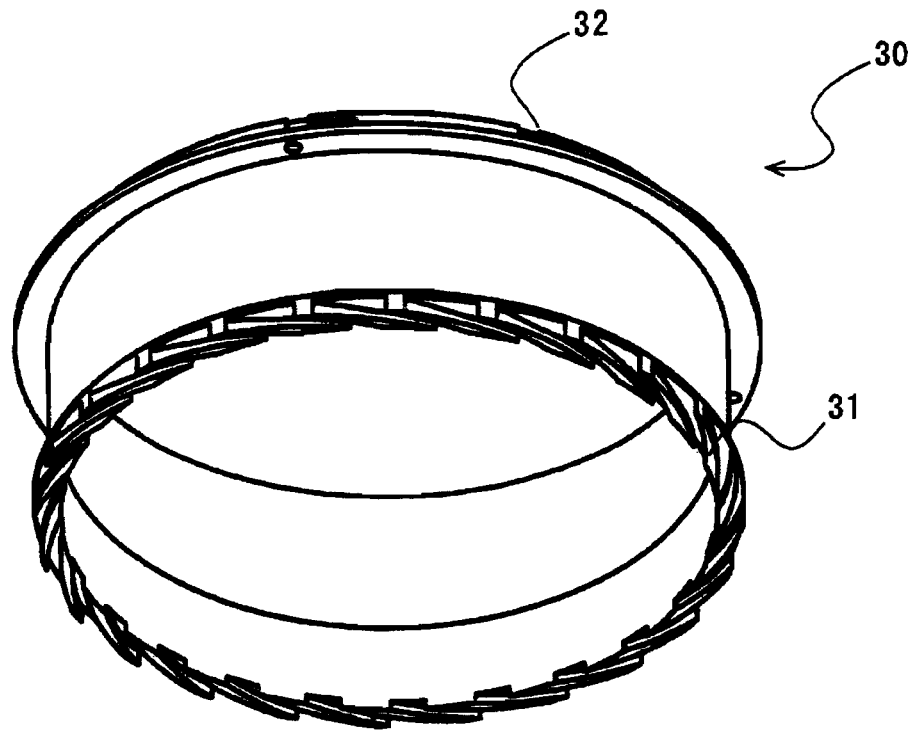
FIG. 9 is a perspective view of a diffuser ring used in an embodiment of the present invention.

FIG. 9 is a perspective view for explaining the details of the diffuser ring 30. The diffuser ring 30 is a cylindrical body having the same opening as the upper opening of the pad body 10. As described above, in the lower end part of the diffuser ring 30, blades 31 tilting in the rotative direction of drilling tool are formed in an aligned manner. The diffuser ring 30 is fixed to the pad body 10 by providing engagement grooves 32 in the upper part of the ring and by engaging engagement claws formed on the pad body 10 with the engagement grooves 32.

The diffuser ring 30 in this embodiment is provided with 24 blades, and the sum ($s_{1A}$) of the effective suction areas ($s_1$) thereof is 96 mm². The value of $s_{1A}$ is set so that $s_{1A}/So=1/11.8$, wherein So is the inside diameter area (1134 mm²) of the drain. Also, the ratio of the effective suction area ($s_1$) to the effective discharge area ($s_2$) is set so that $s_1/s_2=1/3.5$.

The inner wall plate 40 is a plate member formed in advance into an arcuate shape in cross section. The inner wall plate 40 is fixed to the pad body 10 by forming an engagement groove 41 in both end parts of the inner wall plate 40 and by engaging engagement claws (not shown) formed on the pad body 10 with the engagement grooves 41. A gap is formed between the lower end part of the inner wall plate 40 having been fixed and a drilling surface so that the drain 11 (pressure space) and the internal space of the diffuser ring 30 communicate with each other.

Figure 10:
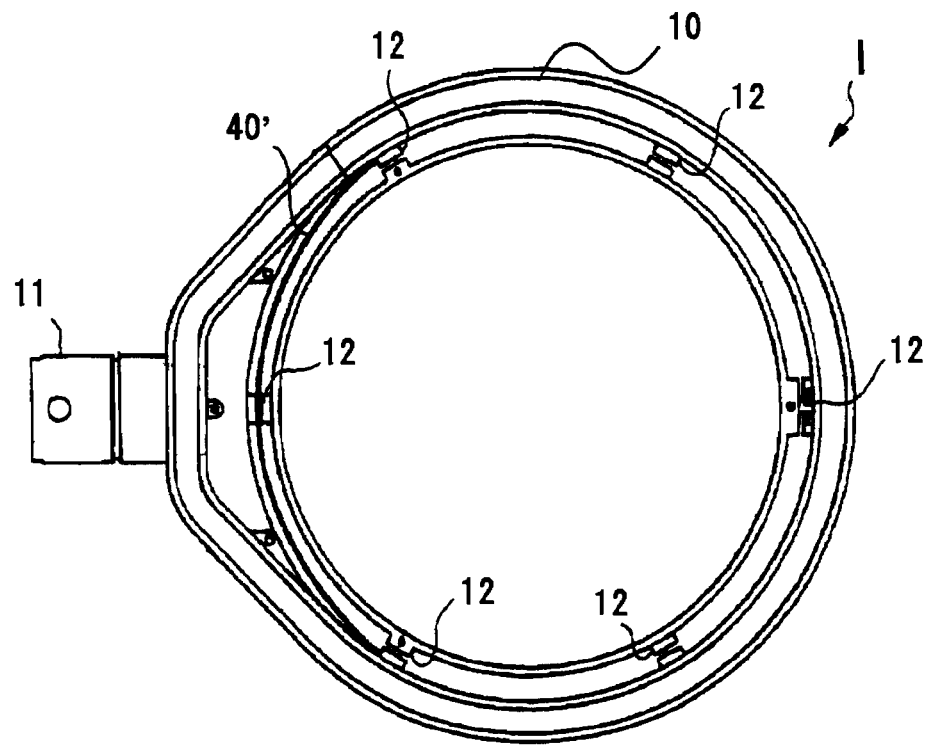
FIG. 10 is an explanatory view for illustrating a state in which an inner wall plate is mounted.

Besides the inner wall plate 40 formed into an arcuate shape in cross section as in this embodiment, an inner wall plate 40' formed with a flat plate made of an elastic material can also be used. In this case, as shown in FIG. 10, a guide 12 having a circumferentially shaped engagement groove is formed on the upper back surface of the pad body 10, and the inner wall plate 40' is positioned along the guide 12, by which the inner wall plate 40' is fixed by using the engagement groove. At this time, both end parts of the inner wall plate 40' are brought into contact with the inner wall of the pad body 10 to form a pressure space.

The shielding plate 50 is a plate member having a trapezoidal shape along the raised part of the pad body 10 as shown in FIG. 7. The shielding plate 50 is fixed by locking protrusions 51 in both end parts thereof to a locking groove (not shown) formed in the pad body. The installation of the shielding plate 50 restricts the volume of the pressure space of the installation region, by which the draining efficiency due to a cleaner can be secured.

Next, the process of drilling work performed using the water treatment pad 1 in accordance with this embodiment is explained. When a hole is drilled in a floor surface as the general work posture, the drilling position is determined, and the water treatment pad 1, which has been assembled in advance, is set so that the center thereof coincides with the drilling position. A vacuum cleaner (not shown) is connected to the drain 11. When the water treatment pad 1 is set, the pad 1 is pressed from the upside, by which the seal member 20 at the lower end is contracted so that the height of attraction due to the cleaner is small. After the water treatment pad 1 has been installed and fixed, a core drill C is positioned with respect to the drilling position from the upper opening, and a driving motor (not shown) is started to start drilling work. During the drilling work, machining water is supplied from the interior of the core drill C.

Figure 1A:
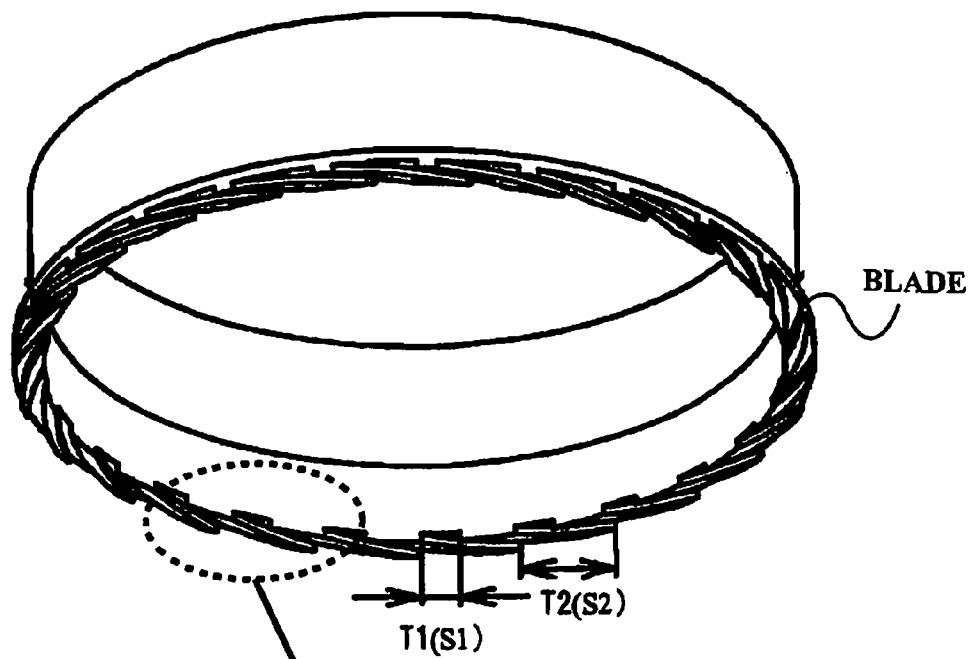
FIG. 1A and FIG. 1B is a perspective view showing an appearance of a diffuser ring of a water treatment pad in accordance with an embodiment of the present invention.
Figure 1B:
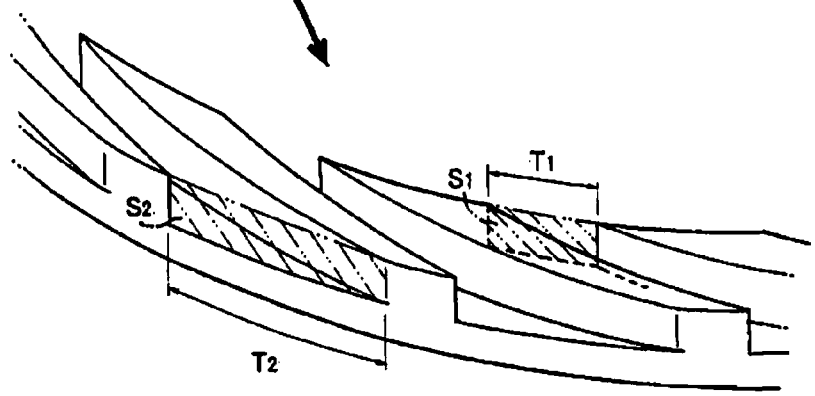
Figure 2A:
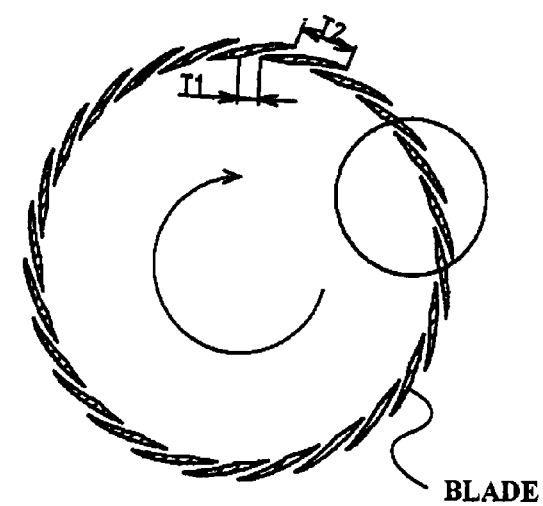
FIG. 2A and FIG. 2B is an explanatory view for illustrating the shape of the lower end face of a diffuser ring.
Figure 2B:
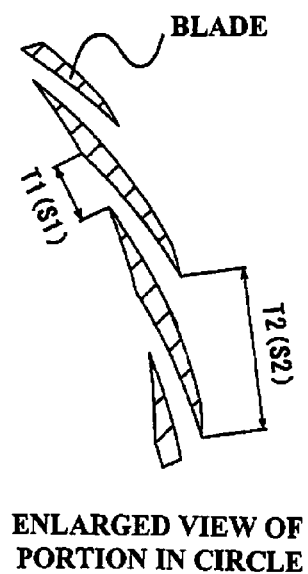
Figure 3A:
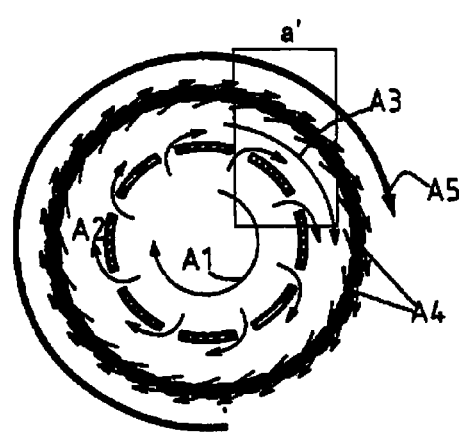
FIG. 3A and FIG. 3B is an explanatory view for illustrating the generation of a fluid at the time when a hole is drilled by using a diffuser ring.
Figure 3B:
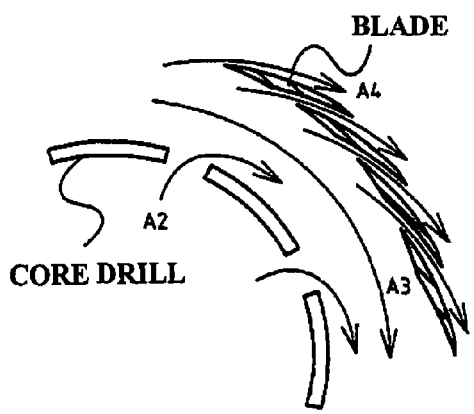
Figure 4:
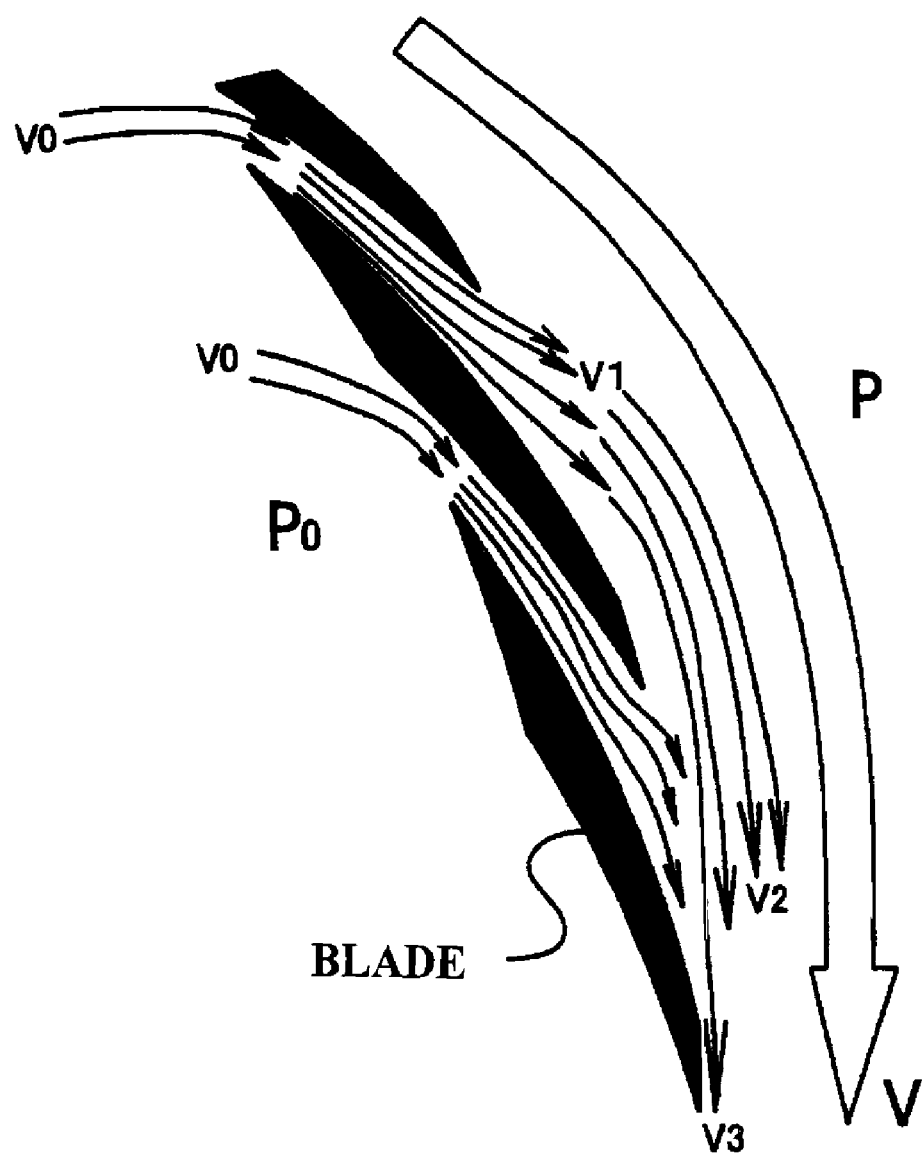
FIG. 4 is an explanatory view for illustrating the velocity increasing effect of a generated fluid.
Figure 5:
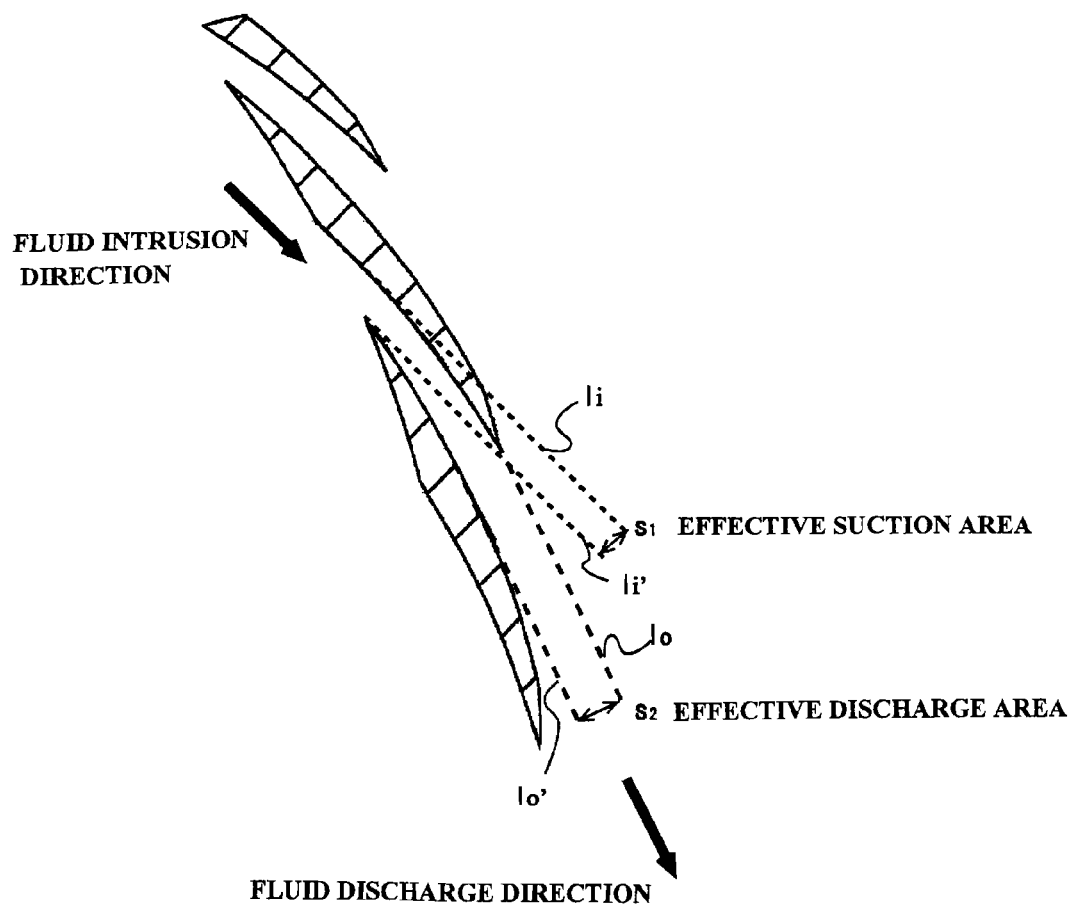
FIG. 5 is an explanatory view for illustrating an effective suction area ($s_i$) and an effective discharge area ($s_2$) of a diffuser ring.
Figure 6:
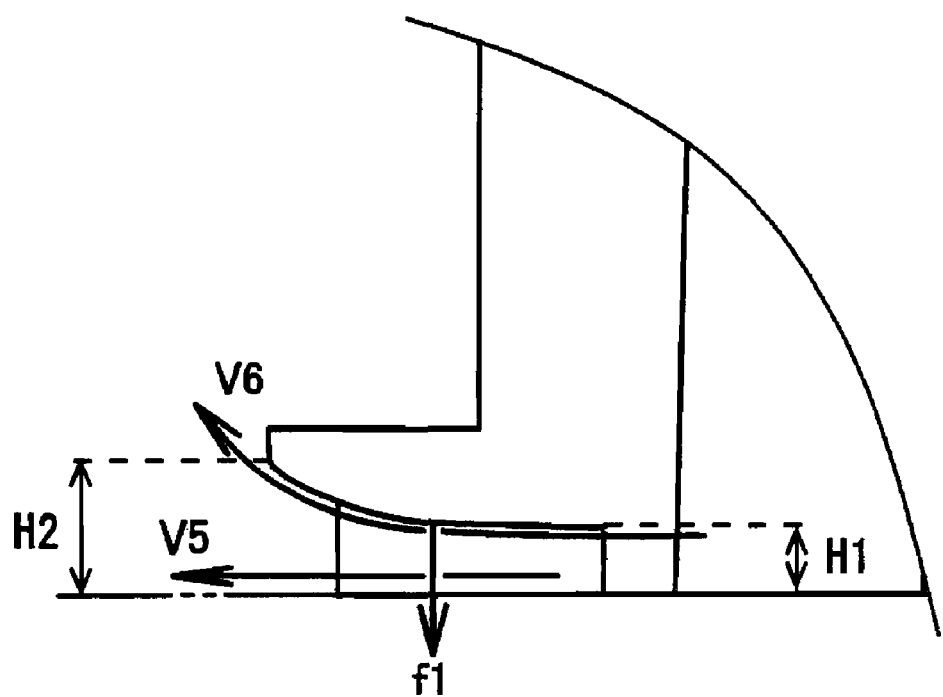
FIG. 6 is a schematic view showing a longitudinal sectional shape of a blade of a diffuser ring.
Figure 11:
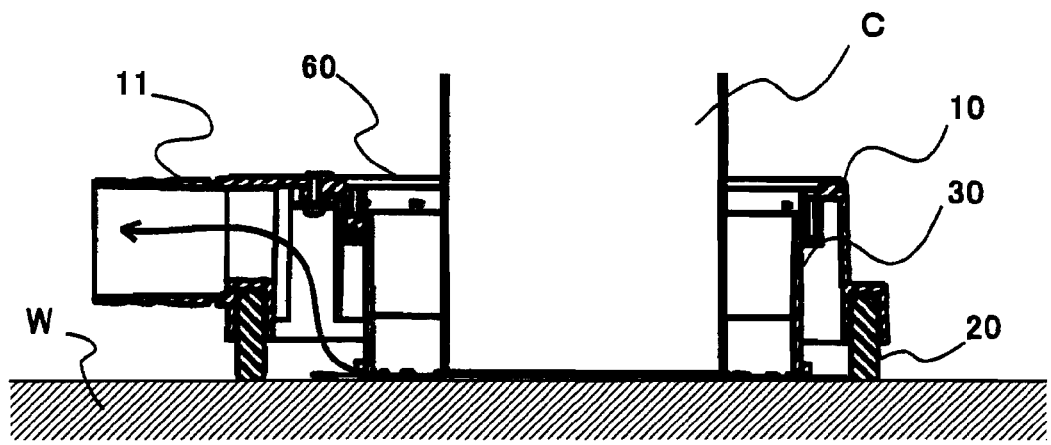
FIG. 11 is a sectional view of a water treatment pad at the time of drilling work.

FIG. 11 is a transverse sectional view showing the state in which the water treatment pad 1 and the core drill C are set. Supply of machining water is started while the driving motor is activated, and at the same time, draining operation with the cleaner is started. Then, in the diffuser ring 30, a fluid consisting of air sent from a clearance between the core drill C and the circular plate 60 and machining water in the core drill C is generated. As explained before with reference to FIG. 3A and FIG. 3B rotating fluid (A5) accelerated by the blades of the diffuser ring 30. Thereby, the pressure in the diffuser ring 30 is made negative, and thereby the water treatment pad 1 is firmly attracted to the drilling surface.

The fluid (machining water, chips, air) discharged from the diffuser ring 30 is immediately introduced into the pressure space near the drain 11, and is drained to the outside of the system by the cleaner. Thus, the machining water is attracted and drained efficiently, so that after the finish of drilling work, the machining water scarcely remains in the pad 1. This state is continued until the finish of drilling work.

For the water treatment pad 1 in accordance with this embodiment, each of the members thereof is detachable. Therefore, after the drilling work, the pad 1 is removed, and the interior thereof can be cleaned by removing the diffuser ring 30, the inner wall plate 40, and the like. At this time, even if the machining remainder still remains near the drain 11, it can be removed easily because the construction of the pad body 10 is also simple.

Figure 12:
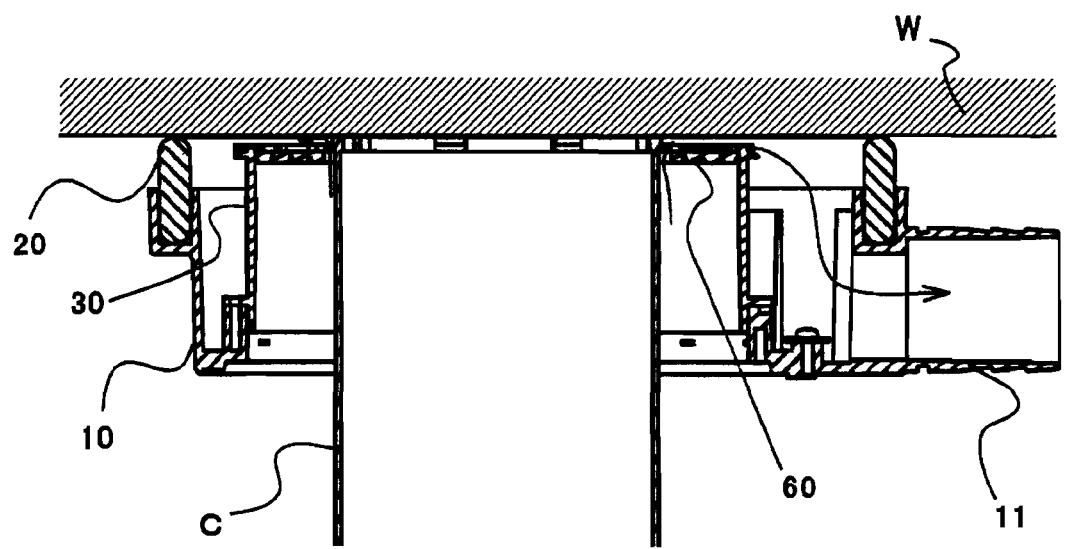
FIG. 12 is a sectional view of a water treatment pad at the time when a hole is drilled in a ceiling surface.

The water treatment pad 1 in accordance with the present invention is useful regardless of the work posture. This is because the effect of making the pressure in the pad negative by means of the diffuser ring is achieved regardless of the installation direction of pad. Therefore, the water treatment pad in accordance with the present invention can be used for wall surface drilling and ceiling surface drilling without any special hindrance in addition to the floor surface drilling explained above. For example, FIG. 12 is a sectional view of the water treatment pad for drilling work on the ceiling surface. In this case, the circular plate 60 can be placed so as to be capable of moving up and down in the diffuser ring. For the ceiling surface drilling, the circular plate 60 is brought close to the drilling surface and placed near the blades of the diffuser ring, whereby the machining water can be drained quickly by the cleaner without leakage thereof.

Figure 13A:
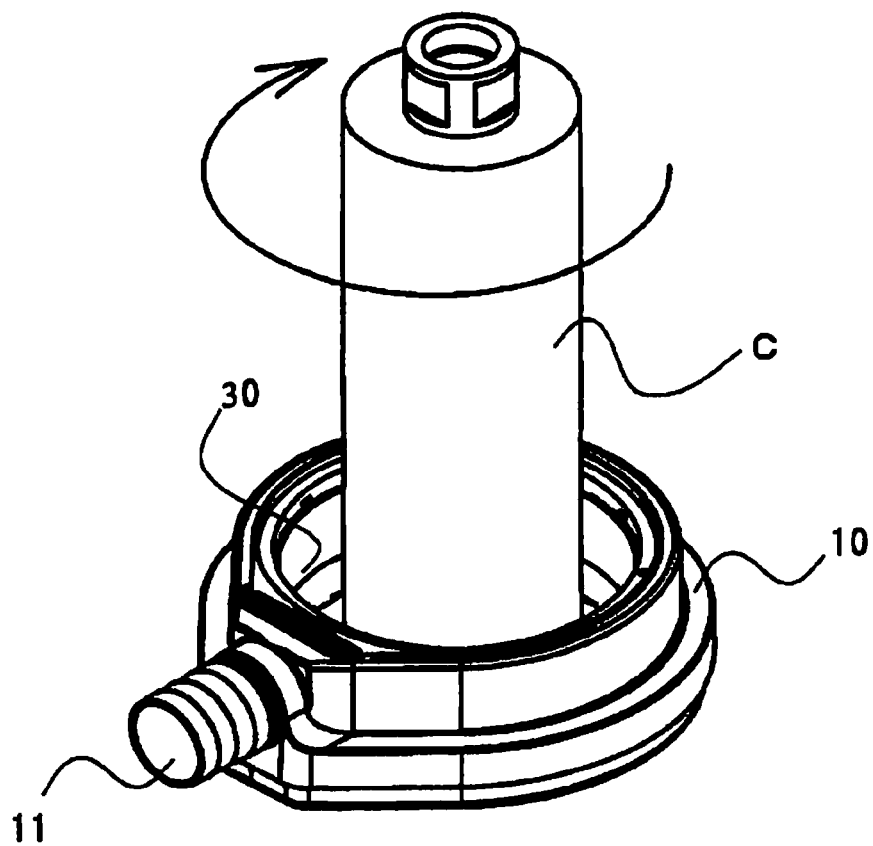
FIG. 13A and FIG. 13B are appearance views showing a state in which a core drill is eccentrically set in a water treatment pad.
Figure 13B:
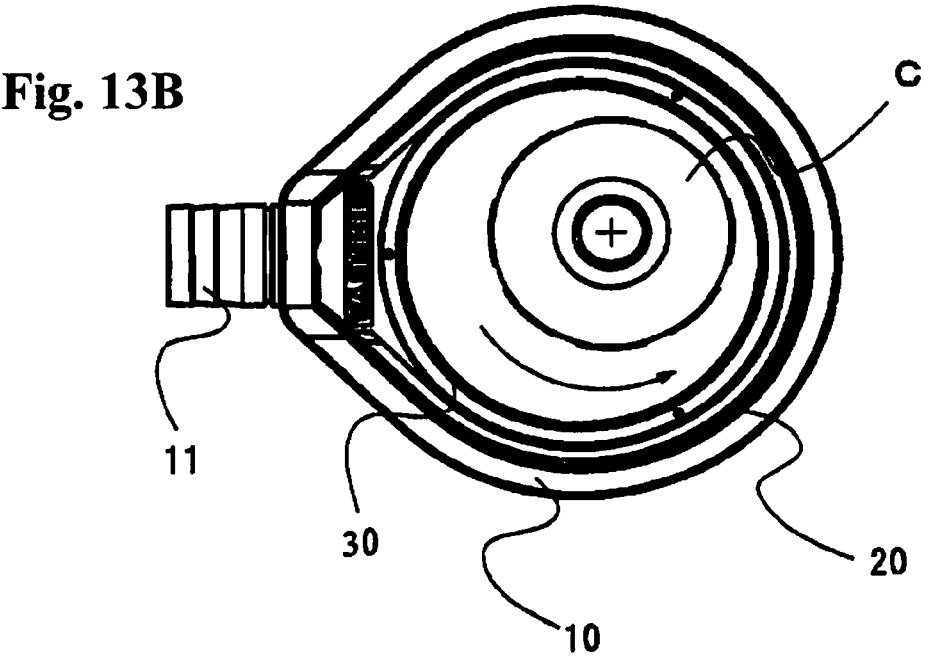
Figure 14A:
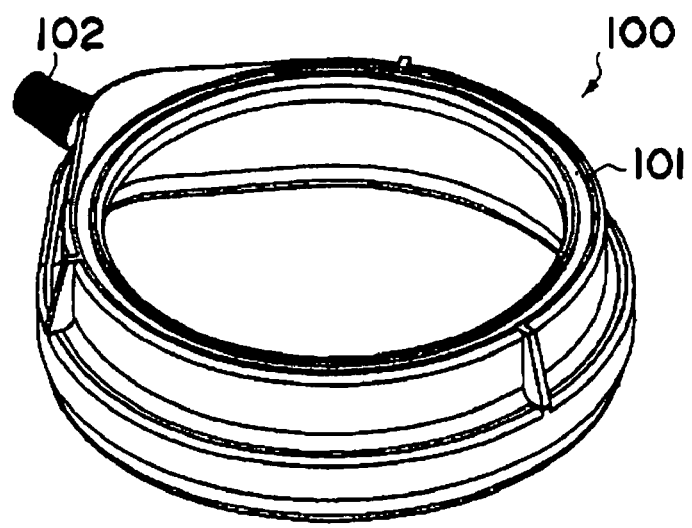
FIG. 14A and FIG. 14B show perspective and sectional views of a conventional water treatment pad.
Figure 14B:
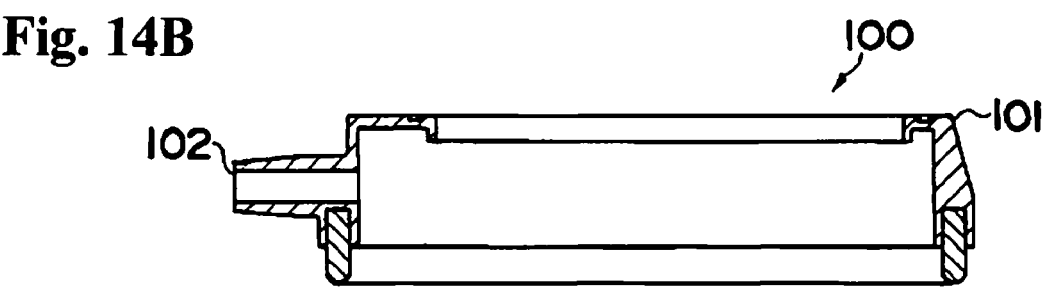
Figure 15A:
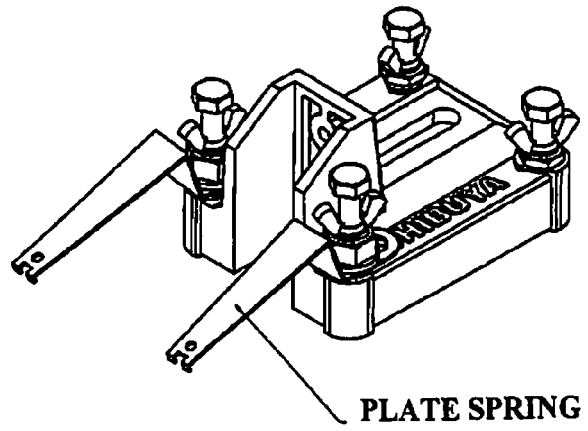
FIG. 15A, FIG. 15B and FIG. 15C show is a perspective view showing examples of fixtures for a conventional water treatment pad.
Figure 15B:
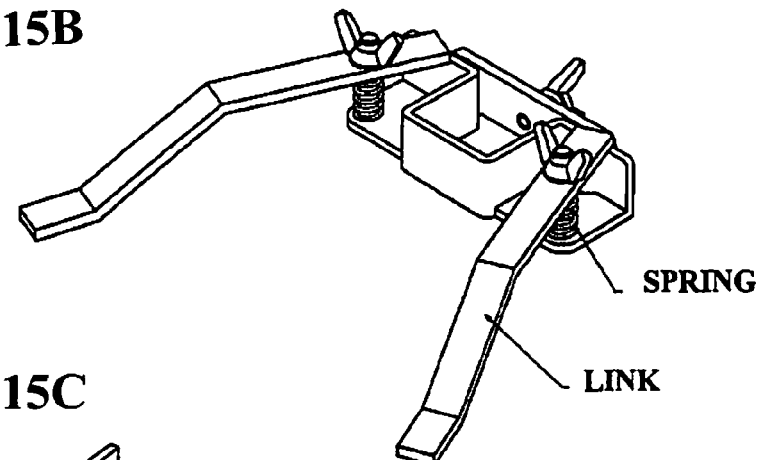
Figure 15C:
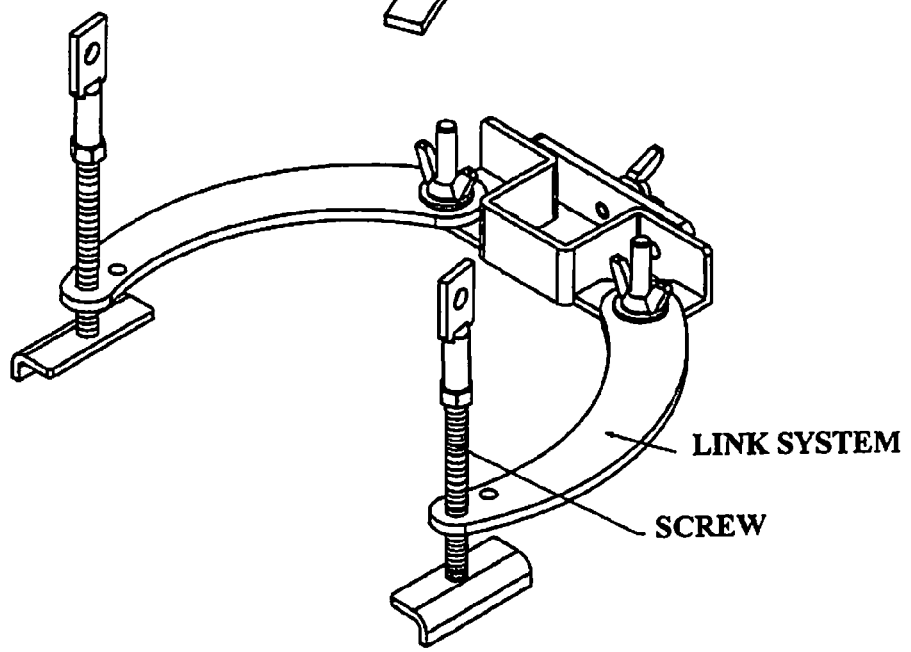
Figure 16:
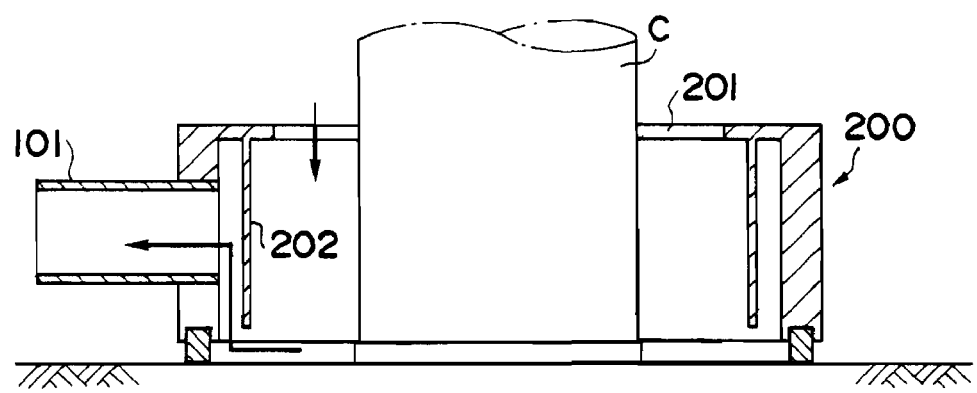
FIG. 16 is a sectional view of a conventional water treatment pad having a double construction.

Also, as described already, the water treatment pad in accordance with this embodiment achieves the effect even if the core drill C is not set at the central position of the diffuser ring (pad). That is to say, even if the core drill C lies at an eccentric position in the diffuser ring opening region as shown in FIG. 13A and FIG. 13B, the pressure in the pad can be made negative effectively, so that the pad can be fixed. This fact is useful, for example, when a hole is drilled at a position near a wall.

What is claimed is:

1. A water treatment pad for a drilling tool, which is installed on a drilling surface of an object to be drilled when a hole is drilled in the object by using the rotating drill tool while machining water is supplied, said water treatment pad comprises:
    a substantially cylindrical pad body having a drain in a side surface thereof and mounted in a manner that surrounds the drilling tool; and
    a cylindrical diffuser ring detachably fixed in the pad body in a manner that surrounds the drilling tool to accelerate a fluid therein and release the fluid to the outside,
    wherein the diffuser ring, which comes into contact with the drilling surface, has on the end surface of convex-shaped blades of which the transverse cross section has an airfoil profile tilting in the rotative direction of the drilling tool are arranged in an aligned fashion, and
    a plane defined by a distance between the adjacent blades and the heights of blades have a relationship in terms of an area ($S_1$) on an inner surface side of the diffuser ring and an area ($S_2$) on an outer surface side of the diffuser ring is $S_1 < S_2$.

2. The water treatment pad for a drilling tool according to claim 1, wherein the ratio ($S_{1A} / S_o$) of the sum ($S_{1A}$) of the effective suction areas ($S_1$) on the inner surface side of all the diffuser ring to an inside diameter area ($S_o$) of the drain of the pad body is 1/20 to 1/10.

3. The water treatment pad for a drilling tool according to claim 1 wherein a bottom surface of a groove formed by the adjacent blades has an airfoil profile in longitudinal cross section.

4. The water treatment pad for a drilling tool according to claim 1 wherein the water treatment pad further comprises an inner wall plate mounted detachably in the pad body so that the transverse cross section thereof is made in an arcuate shape by bringing both the end parts thereof into contact with the inner surface of the pad body at the time of mounting; and a pressure space formed by the inner wall plate and the inner surface of pad body, the drain, and the internal space of a diffuser ring communicate with each other.

5. The water treatment pad for a drilling tool according to claim 4, wherein the water treatment pad further comprises a shielding plate provided between the drain and the lower end part of inner wall plate in the up and down direction and having about the same shape as that of the pressure space.

6. The water treatment pad for a drilling tool according to claim 1 wherein the water treatment pad further comprises at least one circular plate capable of being mounted on the inner wall surface of diffuser ring so that the vertical position thereof is variable and having an opening with a diameter 1.01 to 1.2 times the outside diameter of the drilling tool.

7. The water treatment pad for a drilling tool according to claim 1 wherein a ring-shaped seal member made of an elastic material is provided at the lower end edge of the pad body.

8. The water treatment pad for a drilling tool according to claim 2 wherein a bottom surface of a groove formed by the adjacent blades has an airfoil profile in longitudinal cross section.

9. The water treatment pad for a drilling tool according to claim 2 wherein the water treatment pad further comprises an inner wall plate mounted detachably in the pad body so that the transverse cross section thereof is made in an arcuate shape by bringing both the end parts thereof into contact with the inner surface of the pad body at the time of mounting; and a pressure space formed by the inner wall plate and the inner surface of pad body, the drain, and the internal space of a diffuser ring communicate with each other.

10. The water treatment pad for a drilling tool according to claim 3 wherein the water treatment pad further comprises an inner wall plate mounted detachably in the pad body so that the transverse cross section thereof is made in an arcuate shape by bringing both the end parts thereof into contact with the inner surface of the pad body at the time of mounting; and a pressure space formed by the inner wall plate and the inner surface of pad body, the drain, and the internal space of a diffuser ring communicate with each other.

11. The water treatment pad for a drilling tool according to claim 8 wherein the water treatment pad further comprises an inner wall plate mounted detachably in the pad body so that the transverse cross section thereof is made in an arcuate shape by bringing both the end parts thereof into contact with the inner surface of the pad body at the time of mounting; and a pressure space formed by the inner wall plate and the inner surface of pad body, the drain, and the internal space of a diffuser ring communicate with each other.

12. The water treatment pad for a drilling tool according to claim 9, wherein the water treatment pad further comprises a shielding plate provided between the drain and the lower end part of inner wall plate in the up and down direction and having about the same shape as that of the pressure space.

13. The water treatment pad for a drilling tool according to claim 10, wherein the water treatment pad further comprises a shielding plate provided between the drain and the lower end part of inner wall plate in the up and down direction and having about the same shape as that of the pressure space.

14. The water treatment pad for a drilling tool according to claim 11, wherein the water treatment pad further comprises a shielding plate provided between the drain and the lower end part of inner wall plate in the up and down direction and having about the same shape as that of the pressure space.

15. The water treatment pad for a drilling tool according to claim 12, wherein the water treatment pad further comprises a shielding plate provided between the drain and the lower end part of inner wall plate in the up and down direction and having about the same shape as that of the pressure space.

16. The water treatment pad for a drilling tool according to claim 2 wherein the water treatment pad further comprises at least one circular plate capable of being mounted on the inner wall surface of diffuser ring so that the vertical position thereof is variable and having an opening with a diameter 1.01 to 1.2 times the outside diameter of the drilling tool.

17. The water treatment pad for a drilling tool according to claim 3 wherein the water treatment pad further comprises at least one circular plate capable of being mounted on the inner wall surface of diffuser ring so that the vertical position thereof is variable and having an opening with a diameter 1.01 to 1.2 times the outside diameter of the drilling tool.

18. The water treatment pad for a drilling tool according to claim 8 wherein the water treatment pad further comprises at least one circular plate capable of being mounted on the inner wall surface of diffuser ring so that the vertical position thereof is variable and having an opening with a diameter 1.01 to 1.2times the outside diameter of the drilling tool.

19. The water treatment pad for a drilling tool according to claim 4 wherein the water treatment pad further comprises at least one circular plate capable of being mounted on the inner wall surface of diffuser ring so that the vertical position thereof is variable and having an opening with a diameter 1.01 to 1.2 times the outside diameter of the drilling tool.

20. The water treatment pad for a drilling tool according to claim 9 wherein the water treatment pad further comprises at least one circular plate capable of being mounted on the inner wall surface of diffuser ring so that the vertical position thereof is variable and having an opening with a diameter 1.01 to 1.2 times the outside diameter of the drilling tool.

* * * * *